(No Model.)
A. DE BOVET.
ELECTRIC BRAKE FOR RAILWAYS.
No. 508,805. Patented Nov. 14, 1893.
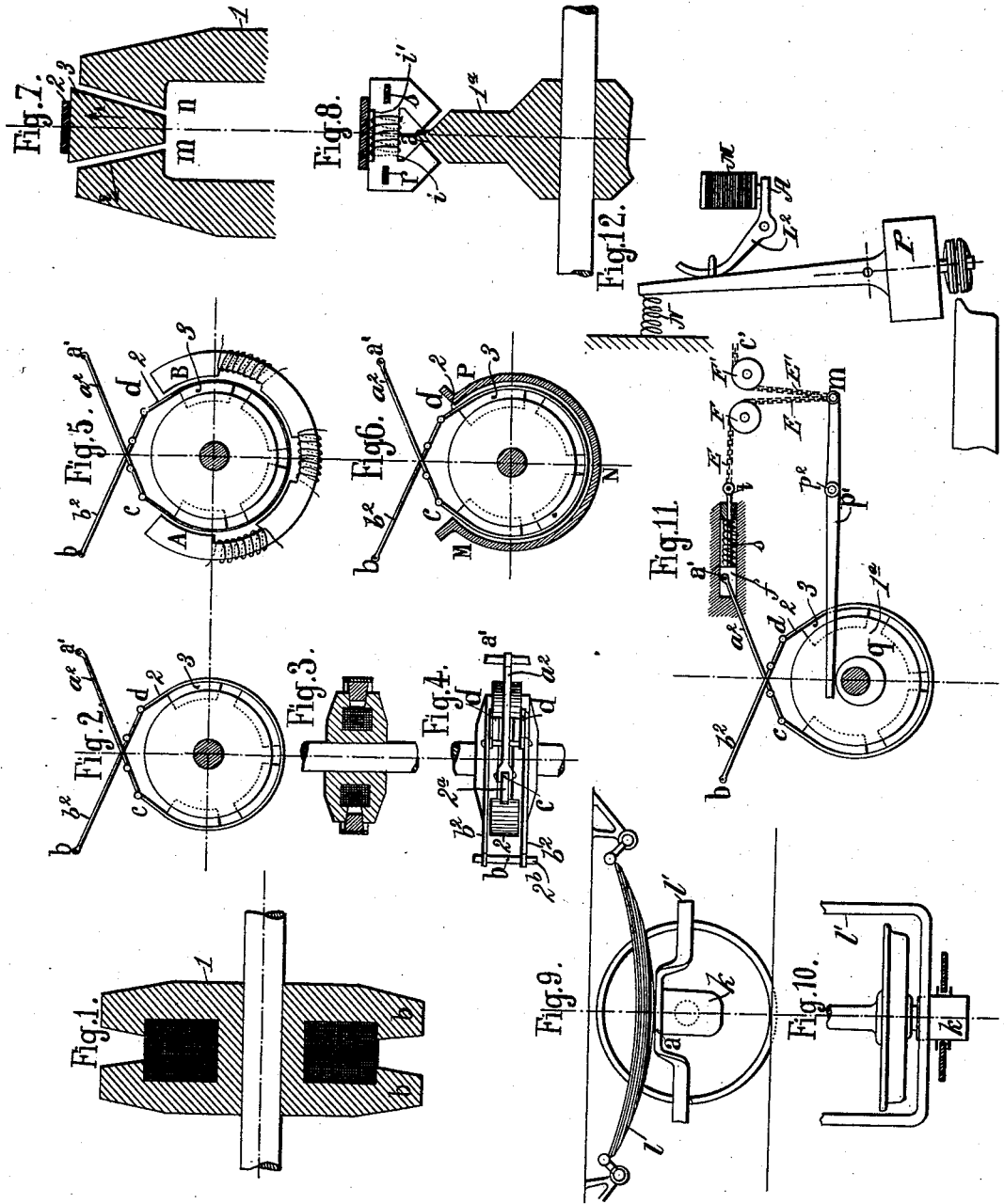
Witnesses:
Geo. W. Rea.
Robert Everett.
Inventor:
Armand de Bovet.
By
James L. Norris,
Atty.
THE NATIONAL LITHOGRAPHING COMPANY,
WASHINGTON, D. C.

UNITED STATES PATENT OFFICE.

ARMAND DE BOVET, OF PARIS, FRANCE.

ELECTRIC BRAKE FOR RAILWAYS.

SPECIFICATION forming part of Letters Patent No. 508,805, dated November 14, 1893.

Application filed April 23, 1892. Serial No. 430,348. (No model.)

*To all whom it may concern:*

Be it known that I, ARMAND DE BOVET, a citizen of France, and a resident of Paris, in the Republic of France, have invented a new and useful Improvement in Electric Brakes for Railways, of which the following is a specification.

The system of brakes described in the following specification acts upon a pulley rigidly mounted on the axle of the vehicle, and not upon the wheels as has usually been the case heretofore.

It is my purpose to place upon the axle of a car, or other vehicle, a pulley containing a spool, or coil, of wire $a$, of such kind that when an electric current is driven through said spool, or coil, it creates two opposite poles upon the two halves $b$, $b$ of the pulley.

The invention consists in the novel features of construction and new combinations of parts hereinafter set forth and then particularly pointed out in the claims which conclude this specification.

To enable others skilled in the art to make, construct and use my said invention I will now describe the same in detail, reference being had to the accompanying drawings, in which—

Figure 1 is a central vertical section of the brake-pulley on the axle. Fig. 2 is an elevation showing the pulley and brake-band the former being mounted on the car-axle. Fig. 3 is a central section of the parts shown in Fig. 2. Fig. 4 is a plan view of a brake, showing the manner of connecting the brake-band. Fig. 5 is an elevation of the same parts, showing also the surrounding crown-piece and disengaging magnet. Fig. 6 is a section through the brake-pulley, showing a modification of the parts shown in Fig. 5. Fig. 7 is a partial section of the brake-pulley and brake-shoe, on an enlarged scale. Fig. 8 is a similar view showing a modified construction. Fig. 9 is a face view of one of the car-wheels showing one form of supporting frame for the brake. Fig. 10 is a plan view of the parts shown in Fig. 9. Fig. 11 is a face view, partly in section, showing one form of automatic brake-setting mechanism. Fig. 12 is a plan view showing a modified construction for accomplishing the same result.

Upon one of the axles of the carriage, or car, is rigidly mounted a brake-pulley 1, divided centrally to form two circular parts which are connected by a hub. In a chamber between these parts, is arranged an electro-coil $a$. Around the periphery of this pulley is arranged a flexible plate 2, bearing a certain number of brake-shoes 3, said number being usually four, as seen in Fig. 2. These shoes are preferably formed of iron, and are so constructed that, when the plate 2 is drawn closely against the face of the pulley, the shoes 3 will be caused to press upon said face, a suitable groove, or channel, being formed therein to preserve the engagement. The contact thus made is intended to short-circuit the electric current through the coil $a$. The ends of the plate 2 are connected to the frame of carriage at the points $a'$ and $b$, (Figs. 2 and 3) by means of iron bolts or rods $a^2$ and $b^2$ which are jointed, at the points $c$ and $d$ to said ends, similar joints being also formed at, or near, the points where the bolts are connected to the carriage-frame. From the point $c$ the connection is made by means of a single bolt, or rod, $a^2$, having a fork at one end which straddles the end of a lug $2^a$ mounted on the end of the flexible plate 2. From the point $d$ the connection is made by two parallel and similar rods, or bolts, $b^2$, connected to the projecting ends of a pintle $2^b$, on the end of the plate 2. These parallel rods $b^2$ cross the rod $a^2$ and lie upon both sides thereof, the connection from each point, $c$ and $d$, being carried from said point to the other side of the axle, in order that said connections may be substantially in the lines of strain of the ends of the plate 2. One purpose of this construction is to avoid undue restraint of the free lateral play of the parts throughout the system of brakes.

It will easily be perceived, by an inspection of the figures of the drawings, that the attraction of the pulley will induce the application of the shoes of the brake to the groove of the pulley and will also produce a tendency to mesh the brake with the pulley with an energy which will depend upon the degree of saturation of the parts magnetized, which will be in proportion to the quantity and intensity of the current and the mass of the metallic plate 2. The jar of the running gear will, when the current is cut off, be sufficient to produce the disengagement of the brake from the pulley, which will be assisted, also by the radial spring of the metallic plate 2. This disengagement may be facilitated, also, by sending a reverse current through the coil for an instant immediately following the suppression of the current by which the brake is set. I am able to render this disengagement certain by arranging round about the metallic plate 2, upon the exterior side thereof, a crown piece of iron, wound with wire, and having pole-pieces which project from its interior face, substantially in the manner shown by A B in Fig. 5. Through the coils surrounding this crown piece the electric current is sent at the moment following its suppression in the coil arranged in the pulley, whereby the shod metal plate 2 will be caused to play freely between the inner and the outer limit of movement of which it is capable.

In case it is not convenient to employ the crown piece A B, it will be sufficient to surround the metallic plate 2 by a circular plate, preferably of non-magnetic metal formed substantially as shown in Fig. 6 and indicated by the letters M N P. Against this plate the metallic shoe plate 2 will strike upon its disengagement, the effect being to confine said plate within suitable proximity to the pulley, and prevent it from withdrawing the brake-shoes from the grooves of the pulley by its elasticity. This construction will also avoid displacement which might be produced by vibration of the running gear when the train is in motion. The bezel shape, or wedging form given to the shoes of the brake, which corresponds to the form of the groove in the pulley, renders it possible that the metallic plate 2 shall have but a feeble recoil after disengagement, for reasons which will readily appear from the illustrations in Fig. 7. The interval of separation between the converging faces of the brake-shoes 3, and the lateral faces of the groove in the pulley 1, will alway be considerably less than the extent of the outward movement of the shoes, by which the separation is effected. For example, referring to Fig. 7, if the shoe 3 is in contact with the pulley, the outward movement in the direction of the arrow 1 being, for the sake of illustration, one inch in length, the interval of separation between the friction-faces of the shoe and the lateral faces of the groove, measured in the line of flight of the arrow 2, will be, perhaps, one-fourth of an inch, only, or in other words, much less than the length of movement by which such interval is produced. As the purpose is merely to maintain an open circuit, a small interval of separation between said friction-faces will be sufficient, and the outward movement of the plate 2 and shoes 3 will be, comparatively, of limited extent.

The construction of the groove in the brake pulley, and the form of the brakes used, should be such that upon setting the brake the shoes will completely fill the groove, and thus avoid the direct loss of power due to the non-employment of a greater or less portion of the working faces $m$, $n$. The two points of attachment $a'$ and $b$ (Fig. 2) being upon the frame of the car or vehicle are separated by an interval proportioned to the degree of elastic yield of the springs, which must have free rise and fall. The pulley of the brake, being mounted upon the axle, and being rigid thereon, it is necessary that the shoe plate shall also be provided with rigid support relatively to the pulley, and its points of support must also be upon the vehicle frame, although the plate itself is merely linked by intermediate devices to the car frame. I will explain farther on how I propose to effect this result, and how the support of the axle with relation to the frame of the car may be effected. Passing over this point for the moment, it will be easily seen how the parts of the brake have free movement in the required directions of setting and disengagement, and how free play is given to the springs of the car without causing displacement of the brake mechanism. With an apparatus like that which I have described, the electric current is usually caused to traverse rings of copper upon the axle, and upon these rings brushes of any suitable pattern will have bearing to permit the transmission of the current to the coil, which revolves with the brake-pulley.

I may modify the arrangement whereby current is applied to the brake by so organizing the parts that the magnetic saturation shall take place in the shoes of the brake, and not in the two parts of the pulley. In this case the pulley will act as the armature, and the shoes will become the magnetic poles, this being merely the reversal of the arrangement already set forth. In this arrangement the magnetizable pulley is replaced by a plain iron disk $1^a$, as seen in Fig. 8. The brake-shoes will be cut away upon two converging planes, meeting in the central plane of the disk, forming a groove to receive the reversely shaped periphery of the disk, and the wire of the coil $a$ may be replaced by a block of soft iron, while the single flexible plate 2 is replaced by two plates $r$ and $s$, traversing the lateral portions of the shoe, which is rigidly mounted thereon.

As in the construction heretofore explained, the number of the brake-shoes to each disk is arbitrary and will depend upon various considerations which play no part in my invention.

An electrical contact of some kind is required in both the arrangements referred to. In a carriage having shafts, or axles, the journals of which support the ordinary journal-boxes, there is no material difficulty in applying my invention. I mount upon the axle, or axles, two circular contacts, upon which rest contact-pieces forming part of the plate 2. This arrangement is substantially shown in Fig. 11, in which the numeral $1^a$ indicates the soft iron disk shown in Fig. 8. Upon the axle of the car is made fast a cam-ring $q$, upon the face of which rests the end of a lever $p'$, fulcrumed at $p^2$, upon a support of any suitable kind which hangs from the car frame. The other end of said lever is connected to two chains E, and E', which run over separate pulleys F, F'. One of said chains is carried from the pulley F and connected to a sliding head $f$ to which the end of the rod $a^2$, is pivotally connected. This head slides in a recess, or box, in the car-frame, or in any suitable adjunct thereof, a spring $g$ being placed therein to restore the head to its normal position. When traction is exerted upon the chain E, the spring $g$ is compressed, and the plate 2 is drawn toward the center of the disk $1^a$, thereby causing the brake-shoes 3 to engage the disk. As this takes place, the magnetic circuit is closed by the movement of the brake-shoes and a current flows through the wires $i, i'$, which are the terminals of a coil upon a core forming part of the shoe 3. The chain E' is extended to another point and serves to perform the same operation subserved by the chain E, being attached to a second sliding head, similar to the head $f$. Under this arrangement, each turn of the axle will vibrate the lever and the setting of the brake will be accomplished in a few turns of the wheel and axle, the setting force being the same at each turn, even though the speed may continually diminish. The lever $p'$, movable upon its fulcrum $p^2$, the axis of which is horizontal, is so mounted thereon as to have a capacity for small lateral play, and its movement in its own plane is produced, in one direction, and maintained as desired, by an electro-magnet, M, the circuit of which is distinct from that which effects the set of the brake. When the current is discontinued, the lever will be operated by the spring N, (Fig. 12.) The lever, in this case, which is denoted by the letter L, will be fulcrumed in a horizontal plane, and upon a vertical axis. Upon the power-end is journaled a pulley P, having upon its axis a grooved friction-roll P' which is made to engage the flange of one of the wheels by the action of the spring N. Its disengagement is caused by a bent lever $L^2$, having one arm pressing against the lever L and provided with an armature A upon its other arm, which is arranged close to the cores of the electro-magnet M. It will be noted that this arrangement is adapted to operate upon a closed circuit. The pulley P receives a strap, belt or other suitable connection, attached to the head $f$. I propose, also, in connecting the running-gear with the frame, to utilize the top of the lubricating-box K, by placing thereon, and between said box and the car-spring, a guard-rail $l$, which is bent in front and in rear of the wheel into substantial parallelism with the axle, and extended entirely across the car, to receive a like support upon the other box K. The transverse portions of this guard-rail are designated by $l'$.

What I claim is—

1. The system of brakes herein described; the same consisting of a series of brake-shoes mounted upon flexible plates which partly surround brake-pulleys, and coils of insulated wire arranged in annular chambers in said brake-pulleys, each of the latter being divided by its annular chamber into two similar parts, substantially as described.

2. The brake system described consisting of a brake having a groove in its working face, an electro-coil arranged to magnetize the parts of the pulley separated by said groove, a flexible plate carrying iron brake shoes entering said groove in the pulley, and a circuit for the coil, substantially as described.

3. In a railway brake the combination with a car axle of a brake pulley rigidly mounted thereon, and having a bezel shaped groove in its working face, an electro-coil arranged in a chamber in said pulley, an elastic metallic plate having iron brake shoes of a form corresponding to the groove in the brake pulley, articulated supports for the metallic plate and a circuit for the electro coil, substantially as described.

In testimony whereof I have signed this specification in the presence of two subscribing witnesses.

ARMAND DE BOVET.

Witnesses:
ROBT. M. HOOPER,
J. V. JONG.